US006806397B1

(12) United States Patent
Reilly

(10) Patent No.: US 6,806,397 B1
(45) Date of Patent: Oct. 19, 2004

(54) SYNTHESIS OF CONDENSED PHASES CONTAINING POLYCYCLIC AROMATIC HYDROCARBONS FULLERENES AND NANOTUBES

(75) Inventor: Peter T. A. Reilly, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,232

(22) Filed: Sep. 17, 1999

(51) Int. Cl.$^7$ ................................................ C07C 2/42
(52) U.S. Cl. ...................................... 585/446; 48/198.3
(58) Field of Search ................................ 585/446, 447, 585/450, 451; 431/8; 48/198.3

(56) References Cited

U.S. PATENT DOCUMENTS

| 5,273,729 A | 12/1993 | Howard et al. |
|---|---|---|
| 5,876,684 A | 3/1999 | Withers et al. |
| 5,985,232 A | 11/1999 | Howard et al. |
| 6,162,411 A | 12/2000 | Howard et al. |

OTHER PUBLICATIONS

Dai et al., 'Synthesis of Carbon–Encapsulated Nanauires Using Polycyclic Aromatic Hydrocarbon Precursors' in *Chemical Physics Letters* vol. 258, pp. 547–553 Aug. 1996.*
Kroto et.al, "C60: Buckminsterfullerene", Nature, vol. 318, 162–163 (1985).
Kroto et.al, "The formation of quasi–icosahedral spiral shell carbon particles", Nature, vol. 331, 328–331 (1988).
Taylor et.al, "Formationn of C$_{60}$ by pyrolysis of naphthalene", Nature, vol. 336, 728–731 (1993).
Ebbesen et.al, "Large Scale synthesis of carbon nanotubes", Nature, vol. 358, 220–222 (1992).
Shatishkumar et.al, "Single Walled nanotubes by the pyrolysis of acetylene–organometallic mixtures", Chemical Physics Letters, vol. 293, 47–52 (1998).
Gerhardt et.al, "Polyhedral Carbon Ions in Hydrocarbon Flames", Chemical Physics Letters, vol. 137, 306–310 (1987).
Pope et.al, "Chemistry of Fullerenes C$_{60}$ and C$_{70}$ Formation in Flames" J. Phys. Chem., vol. 97, 11001–11013, (1993).
Howard et.al, "Fullerenes C$_{60}$ and C$_{70}$ in flames", Nature, vol. 352, 139–141 (1991).
McKinnon et.al, "Combustion Synthesis of Fullerenes", Combustion and Flame, 102–112 (1992).
Dobbins et.al, "Carbonization Rate of Soot Precursor Particles" Combusion Sci. Tech., vol. 121, 103–121, (1996).
Sander et.al, "Polycyclic Aromatic Hydrocarbon Structure Index", NIST Special Publication 922, available at http://ois.nist.gov/pah/alpha.htm.
Dobbins et.al, "The Evolution of Soot Precursor Particles in a Diffusion Flame", Combustion and Flame 115:285–298, (1998).
Weilmunster et.al, "Large Molecules, Radicals, Ions, and Small Soot Particles in Fuel–Rich Hydrocarbon Flames Part I: Positive Ions of Polycyclic Aromatic Hydrocarbons (PAH) in Low–Presure Premixed Flames of Acetylene and Oxygen", Combusion and Flame 116: 62–83, (1999).
Baum et.al, "Fullerene Ions and Their Relation to PAH and Soot in Low–pressure Hydrocarbon Flames", Ber. Bunsenges. Phys. Chem. 96, 841–857, (1992).
Srivastava, "Fullerenes, Synthesis Separation, Characterization, Reaction Chemistry, and Applications–A Review", Energy Sources vol. 17, 615–640 (1995).
Ahrens et.al., "Fullerenes and their ions in hydrocarbon flames", Int. J. Mass Spectrom. Ion Processes, vol. 138, pp. 133–148, 1994.
Frenklach et.al., "Comment on the Proposed . . . ", J. Phys. Chem., vol. 92, pp. 561–563, 1988.
Smalley, "Self–Assembly of Fullerenes", Acc. Chem. Res., vol. 25, pp. 98–105, 1992.
Gieray et.al. "Tandem Mass Spectometry of Uranium and Uranium Oxides in Airborne Particulates", Anal. Chem., vol. 70, pp. 117–120, 1998.
Reilly et.al., "Real–Time Characterization of the Organic Composition and Sixe of Individual Diesel Engine Smoke Particles", Environ. Sci. Technol., vol. 32, pp. 2672–2679, 1998.
Gieray et.al., "Real–time Detection of Individual Airborne Bacteria" J. Microbiological Methods, vol. 29, 191–199, 1997.
Reilly et.al., "Tandem Mass Spectroscopy of Individual Airborne Microparticles" Anal. Chem., vol. 69, pp. 36–39, 1997.
Prather et.al., "Real–time Characterization of Individual Aerosol Particles Using Time of Flight Mass Spectroscopy" Anal. Chem., vol. 66, 1403–1407, 1994.

* cited by examiner

Primary Examiner—Stuart Hendrickson
(74) Attorney, Agent, or Firm—Quarles & Brady LLP

(57) ABSTRACT

The invention relates to methods for producing polycyclic aromatic hydrocarbons, fullerenes, and nanotubes, comprising:
  a. heating at least one carbon-containing material to form a condensed phase comprising at least one polycyclic aromatic hydrocarbon;
  b. collecting at least some of the condensed phase;
  c. reacting the condensed phase to form fullerenes and/or nanotubes.

44 Claims, 8 Drawing Sheets

Non-Polycyclic Hydrocarbons

Polycyclic Aromatic Hydrocarbons

Partially Hydrogenated Polycyclic Aromatic Hydrocarbons

Figure 3

SYNTHESIS OF CONDENSED PHASES CONTAINING POLYCYCLIC AROMATIC HYDROCARBONS FULLERENES AND NANOTUBES

This invention was made with U.S. Government support under Contract No. DE-AC05-96OR22464, awarded by the U.S. Department of Energy. The Government has certain rights in this invention.

FIELD OF THE INVENTION

This invention relates generally to methods for the synthesis of carbon-containing compounds and materials such as polycyclic aromatic hydrocarbons, fullerenes, and nanotubes.

BACKGROUND OF THE INVENTION

Kroto et.al. (Nature, Vol 318(#14), pg162–163, 1985) discovered that laser vaporization of carbon into flowing helium gas results in formation of a new form of carbon, a compound having the composition $C_{60}$. The new C60 molecule was named "Buckminsterfullerene", or "Buckyball" in honor of its almost spheroidal shape, and is a closed truncated icosahedron of carbon atoms, formed from fused five and six-membered aromatic rings.

Subsequent research (see for example Kroto et.al, Nature, Vol 331(#28), pg 328–331, 1988) showed that a much larger family of hollow carbon-cage cluster species generically termed "fullerenes" can be generated from carbon-containing substrates. Large closed-cage fullerenes of formulas including $C_{70}$, $C_{120}$, $C_{130}$, $C_{140}$, $C_{180}$, and $C_{240}$ are believed to exist. Other fullerenes with open (i.e. not closed) carbon cages also exist. U.S. Pat. No. 5,876,684 to Withers et.al. is an example of a method and apparatus for producing fullerenes. Other workers have reported formation of fullerenes from vapor phase pyrolysis of napthalene at temperatures of about 1000° C. (see Taylor et.al., Nature, Vol 366(#23), pg 728–731,1993).

Research has also shown (see for example Ebbesen et.al., Nature, Vol 358(#16), pg 220–222, 1992) that the family of fullerenes includes hollow graphitic tubules whose dimensions are on the order of nanometers. These hollow graphic tubules have walls formed from sheets of fused six-membered rings. The walls of the nanotubes may comprise many concentric layers of the graphitic sheets, or may have a single layered wall (see for example Satishkumar et.al., Chemical Physics Letters, Vol 293, pg 47–52, 1998).

Fullerene-type ions and molecules have also been spectroscopically detected in the vapor phase of sooting flames (see for example, Gerhardt et.al, Chemical Physics Letters, Vol 137, pg 306–310, 1987; Pope et.al., J. Phys. Chem., Vol 97, pg 1101–1103, 1993). Other workers have extracted fullerenes from soot (see Howard et. al., Nature, Vol 352 (#1.1), pg 139–141, 1991;McKinnon et.al., Combustion and Flame, Vol 88, pg 102–112, 1992).

Fullerenes and nanotubes have a variety of uses, including use as superconductors, photo-conductors, micro-lubricants, catalysts, catalyst supports, electrodes for batteries, adsorbents, hydrogen storage media, plant-growth regulators, and pharmaceuticals. In response to such uses, a variety of methods for synthesizing, characterizing, and purifyng fullerenes and nanotubes have been developed (see for example Srivastava, Energy Sources, Vol 17, pg 615–640, 1995). Nevertheless, the yields of fullerenes and nanotubes remain low, and costs of producing and purifying fullerenes remains extremely high, which has significantly limited the commercial viability of many potential applications.

The chemistry of flame combustion, and the process of soot formation in flames has been investigated. For example, it is known that polycyclic aromatic hydrocarbons are formed in flames, and that the polycyclic aromatic hydrocarbons may be precursors of soot in flames (see for example, Dobbins et.al., Combust. Sci.and Tech., Vol. 121, pg 103–121, 1996). Polycyclic aromatic hydrocarbons ("PAHs") are a large class of hydrocarbon compounds having fused five and/or six membered aromatic ring residues. A list of about 622 known polycyclic hydrocarbons has been tabulated by Sanders and Wise of the National Institute of Standards and Technology, in NIST Special Publication 922, available at inter-alia, the NIST website.

Polycyclic hydrocarbons initially and predominately grow in the vapor phase of a flame by step-wise condensation of two carbon fragments. PAH compounds with even numbers of carbon atoms, comprising planar arrays of fused six-membered benzene residues are believed to predominate over PAH compounds with odd numbers of carbon atoms or five-membered rings in flames, because of differences in thermodynamic stability (see Dobbins, et.al., Combustion and Flame, Vol 115, pg 285–298, 1998, and Weilmünster et.al., Combustion and Flame, Vol 116, pg 62–83, 1999).

Baum et.al. (Ber Bunsenges Phys. Chem. Vol 96(7), pg. 841–857, 1992) have suggested that fullerenes may form by coagulation or condensation of PAH molecules with other PAH molecules or immature soot particles.

However, there remains a need in the art for improved and lower cost methods for the synthesis of polycyclic aromatic hydrocarbons, fullerenes and nanotubes.

SUMMARY OF THE INVENTION

Among other things, the present invention relates to a method for collecting materials from a flame, which materials include unexpectedly large condensed phase, "liquid-like" droplets or particles which contain large quantities of polycyclic aromatic hydrocarbons. In addition, the present invention is based on the recognition that PAH containing condensed phases have value, can be collected, and may be practically utilized for purposes other than combustion. In particular, the PAH containing condensed phases may be collected, and subsequently reacted to synthesize other valuable chemical compounds. For example, the condensed phase comprising polycyclic aromatic hydrocarbons can be reacted to produce fullerenes, nanotubes, and other valuable materials.

The inventors have also unexpectedly discovered that fullerenes and nanotubes are advantageously formed in liquid phases containing PAH compounds. While not wishing to be bound by theory, it is believed that the rate of growth of relatively large fullerenes and nanotubes is increased in the liquid phase, by condensation or dimerization reactions between PAH compounds. Because of the high concentrations of PAH compounds which may be produced in liquid phases, high reaction rates can be obtained.

Therefore, this invention, in one aspect, relates to a method for producing a polycyclic aromatic hydrocarbon comprising:

a. condensing at least one carbon-containing material in a flame to form a condensed phase; and b. collecting at least a portion of the condensed phase from the flame; wherein the condensed phase comprises at least one polycyclic aromatic hydrocarbon.

In another aspect, the invention relates to a method for producing fullerenes and nanotubes comprising:

a. heating at least one carbon-containing material to form a condensed phase comprising at least one polycyclic aromatic hydrocarbon;

b. collecting at least some of the condensed phase;

c. reacting the condensed phase to form fullerenes and/or nanotubes.

In other aspects, the invention relates to the products produced by the processes of the invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 3 shows the aerodynamic particle size distribution of 2000 particles collected from an acetylene flame, as described in Example 1.

DESCRIPTION OF THE PREFERRED EMBODIMENTS

Figure 1:
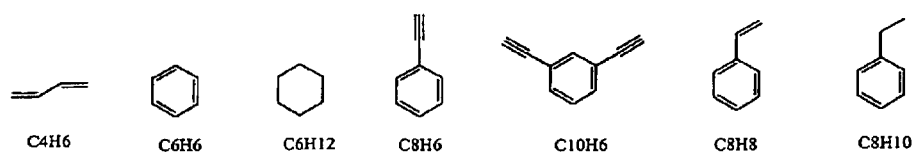
FIG. 1 shows chemical drawings of the structures of various exemplary hydrocarbons, including polycyclic aromatic hydrocarbons.
Figure 1:
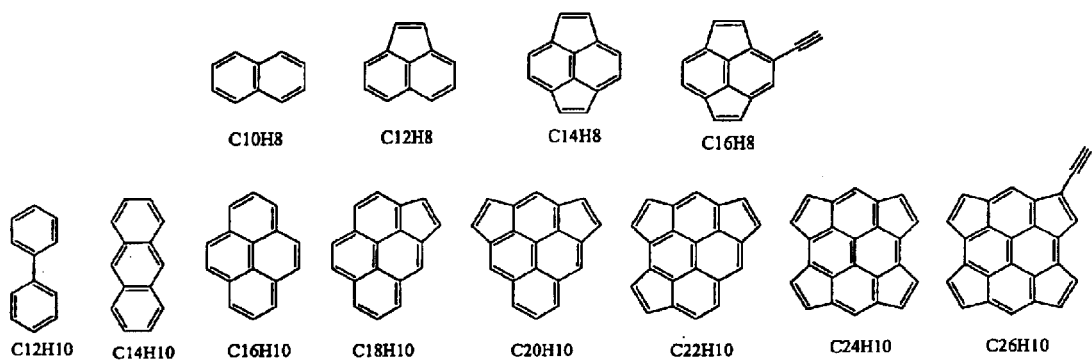
Figure 1:
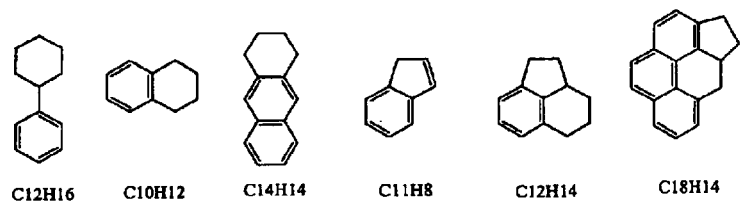

The present invention may be understood more readily by reference to the following detailed description of preferred embodiments of the invention and the Examples included therein and to the Figures and their previous and following description.

Before the present compounds, compositions and methods are disclosed and described, it is to be understood that this invention is not limited to specific synthetic methods, which may, of course, vary. It is also to be understood that the terminology used herein is for the purpose of describing particular embodiments only and is not intended to be limiting.

Nevertheless, in this specification and in the claims which follow, reference will be made to a number of terms which shall be defined to have the following meanings for the purposes of this invention:

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, a benzene residue in a larger hydrocarbon refers to a cyclic six membered ring of carbon atoms having three conjugated carbon-carbon bonds, regardless of other substituents on the carbons of the rings, or whether benzene was used to prepare the hydrocarbon. Similarly, a cyclohexane residue in a hydrocarbon refers to a cyclic six membered ring of carbon atoms having no carbon-carbon double bonds, regardless of the other substituents on the carbons of the ring, or whether cyclohexane was used to prepare the hydrocarbon. Furthermore, a cyclopentene residue in a hydrocarbon refers to a cyclic five membered ring of carbon atoms having only one carbon-carbon bond, regardless of the other substituents on the carbons of the ring, or whether cyclopentene was used to prepare the hydrocarbon.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "alkylene" as used herein refers to a difunctional saturated branched or unbranched hydrocarbon chain containing from 1 to 24 carbon atoms, and includes, for example, methylene (—$CH_2$—), ethylene (—$CH_2$—$CH_2$—), propylene (—$CH_2$—$CH_2$—$CH_2$—), 2-methylpropylene [—$CH_2$—CH($CH_3$)—$CH_2$—], hexylene [—$(CH_2)_6$—] and the like. "Lower alkylene" refers to an alkylene group of from 1 to 6, more preferably from 1 to 4, carbon atoms. The term "cycloalkylene" as used herein refers to a cyclic alkylene group, typically a 5- or 6-membered ring.

The term "alkene" as used herein intends a mono-unsaturated or di-unsaturated hydrocarbon group of 2 to 24 carbon atoms. Preferred groups within this class contain 2 to 12 carbon atoms. Asymmetric structures such as (AB)C=C(CD) are intended to include both the E and Z isomers. This may be presumed in structural formulae herein wherein an asymmetric alkene is present, or it may be explicitly indicated by the bond symbol —.

The term "aromatic" as used herein intends a carbonaceous or hydrocarbon compound having within the compound a cyclic residue of five to eight carbon atoms, which has a conjugated array of double bonds around the ring. Most aromatic rings contain 4n+2 Π electrons, as contributed by the carbon or other atoms of the ring, wherein n is zero or a positive integer. For example, napthalene contains two fused six membered benzene residues, with a conjugated array of double bonds around each ring. Moreover, each benzene residue of the overall napthalene ring structure has six carbon atoms, each carbon atom contributing one Π electron to the conjugated array of double bonds in the ring residue. Therefore, napthalene is an aromatic compound under the instant definition. Similarly, indene, $C_9H_8$, which has a cyclopentene residue fused to a benzene residue, is aromatic because of the benzene residue. Moreover, an indenyl anion, $C_9H_7^-$, has the structure of indene, except that a hydrogen nucleus has been removed from the cyclpentene ring, without removal of the associated electron. An indenyl anion is aromatic both because of its bezene residue, and it cyclopentadienyl residue, both of which contain six Π electrons. Aromatic compounds include heterocyclic aromatic compounds, such as pyridine, furan, and the like.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

As discussed above, the invention relates to a method for producing a polycyclic aromatic hydrocarbon comprising:

a. condensing at least one carbon-containing material in a flame to form a condensed phase; and b. collecting at least a portion of the condensed phase from the flame; wherein the condensed phase comprises at least one polycyclic aromatic hydrocarbon. A polycyclic aromatic hydrocarbon ("PAH") is defined for the purposes of this invention as a compound having more than 6 carbon atoms bonded to form at least two rings, and at least one carbon-hydrogen bond; and wherein at least one of the rings is an aromatic ring.

Although a PAH may have as few as six carbon atoms and one hydrogen atom, they may comprise very large numbers of carbon and hydrogen atoms, just as the more general class of hydrocarbons may have large numbers of carbon and hydrogen atoms. In preferred embodiments, a PAH may have from about 8 to about 1000 carbon atoms, and from about 4 to about 1500 hydrogen atoms. In more preferred embodiments, a PAH may have from about 10 to about 500 carbon atoms, and from about 8 to about 750 hydrogen atoms. Although PAH compounds often have even numbers of carbon atoms, odd numbers of carbon atoms are permissible, especially for PAH compounds of higher molecular weight.

Although PAH compounds typically contain only carbon and hydrogen atoms, in some embodiments a PAH may also contain one or more heteroatoms, such as nitrogen, oxygen, sulfur, halides, or metals. Main group heteroatoms such as nitrogen, oxygen, sulfur may be incorporated into the ring structure of the PAH, or be present as a peripheral substituent group bonded to a carbon atom of a ring. PAH compounds also form complexes to certain metals, particularly transition metals, lanthanide metals, and actinide metals. An otherwise suitable PAH compound is not is not excluded from the class of PAHs merely because of the presence of a complexed metal.

A PAH compound may have as few as two bonded rings, but they may have a very large number of rings, within the bounds which are reasonably chemically stable for a given number of carbon and hydrogen atoms. The rings are typically present in the form of smallest ring residues having from about 3 to about 10 carbon atoms. Preferably, the smallest ring residues have 5 or 6 carbon atoms. The ring residues may be joined or fused to form larger overall ring systems. The rings may be bonded together in a wide variety of fashions, to form a wide variety of isomers. For example, anthracene and phenanthrene both have the formula $C_{14}H_{10}$ and contain three fused six-membered aromatic ring residues which combine to form an outer fourteen-membered ring, but have different three dimensional structures. The carbon atoms of the rings of a PAH compound may be joined by a single carbon-carbon bond, may be fused together by several joint carbon-carbon bonds, or may be connected by a joint alkylene or heteroatom substituent group. The carbon atoms of the rings may have alkyl or other non-cyclic substituent groups. At least one of rings of the PAH must be an aromatic ring.

In many preferred embodiments, the polycyclic aromatic hydrocarbon comprises a plurality of fused five and six membered rings, some or all of which may be aromatic rings. A preferred subset of the PAH compounds within the scope of the invention includes about 660 known low and moderate molecular weight PAH compounds identified in National Institute of Standards and Technology Special Publication 922, available at inter-alia, the NIST website, which is hereby incorporated in its entirety by this reference. Most of the PAH compounds listed in Special Publication 922 are fully aromatic, in that all possible positions of the rings are part of conjugated double bond systems.

Not all the rings of a PAH need be aromatic, in that some of the double bonds of rings of a PAH parent compound may be completely or partially hydrogenated (or otherwise reacted or formed), so as to contain partially or completely saturated cyclic residues. In these embodiments, the polycyclic aromatic hydrocarbon has sufficient hydrogen atoms to have at least one ring with at least one saturated —$CH_2$— group. A preferred subset of partially hydrogenated PAH compounds comprises partially hydrogenated derivatives of the PAH compounds identified in National Institute of Standards and Technology Special Publication 922.

In certain preferred embodiments, the polycyclic aromatic hydrocarbon comprises at least one low molecular weight polycyclic aromatic hydrocarbon, at least one high molecular weight polycyclic aromatic hydrocarbon, or a mixture thereof. Mixtures of low and high molecular weight PAHs are common.

In some embodiments, the PAH comprises a low molecular weight polycyclic aromatic hydrocarbon having from about ten to about thirty carbon atoms. Preferably, the low molecular weight polycyclic aromatic hydrocarbon has a molecular weight from about 140 to about 400 grams per mole. Even more preferably, the low molecular weight polycyclic aromatic hydrocarbon has a molecular weight from about 180 to about 350 grams per mole. For purely illustrative purposes, a very small subset of low molecular weight PAH compounds, partially hydrogenated PAH compounds, (and several non-PAH hydrocarbon compounds) are shown in FIG. 1. An even more preferred subset of low molecular weight, partially hydrogenated PAH compounds, which are readily detectible by mass spectral methods, comprises $C_{15}H_{12}$, $C_{16}H_{12}$, $C_{17}H_{14}$, $C_{18}H_{14}$, $C_{19}H_{14}$, $C_{20}H_{14}$, $C_{21}H_{14}$, $C_{22}H_{12}$, $C_{23}H_{14}$, $C_{24}H_{14}$, $C_{25}H_{14}$, and $C_{26}H_{14}$.

The methods of the invention also produce high molecular weight polycyclic aromatic hydrocarbons having from about thirty carbon atoms to about 1000 carbon atoms. Such high molecular weight PAHs may be derived from condensation or dimerization of lower molecular weight PAHs, or by other mechanisms. In alternative preferred embodiments, high molecular weight PAHs may have from about 30 carbon atoms, up to about 750 carbon atoms, up to about 500 carbon atoms, up to about 250 carbon atoms, or up to about 100 carbon atoms. Similar to other high molecular weight polymeric materials, high molecular weight PAH's may have too high a molecular weight or be insufficiently volatile to be detectable by typical spectroscopic methods such as mass spectroscopy. High molecular weight PAHs may be completely aromatic, or may be partially hydrogenated, therefore their hydrogen content may vary widely depending upon the number of carbon atoms and rings, and the degree of hydrogenation.

In many embodiments, the high molecular weight polycyclic aromatic hydrocarbon is an oil. Increasing degrees of hydrogenation of the PAHs can disrupt the planar structure of aromatic rings, and give a more three-dimension shape and increased flexibility to the resulting hydrogenated, high molecular weight PAH's, which tends to decrease their tendency to form solids, and increase their tendency to occur in the form of oils or other liquid phases.

In one step of the inventive method, carbon-containing materials are heated or condensed in a flame to form a condensed phase, wherein the condensed phase comprises at least one polycyclic aromatic hydrocarbon. In many embodiments of the method, the condensed phase comprises a liquid phase. The condensed phase may comprise a liquid phase over an extremely wide range of temperature. In particular, at least some of the condensed phase may comprise a liquid phase at temperatures which range from about ambient temperatures, up to about the temperature of a flame. In some preferred embodiments the liquid phase does not undergo substantial evaporation at temperatures up to about the temperature of the flame. In preferred embodiments, the condensed phase may comprise a liquid phase at temperatures ranging from about 500° C., up to about 2500° C. In even more preferred embodiments, the condensed phase may comprise a liquid phase at temperatures ranging from about 700° C., up to about 1500° C. While the presence of a liquid phase over such a wide range of temperatures is quite surprising, given the typical presence of a mixture of low and high molecular weight PAHs, including PAH's in the form of oils, the presence of a liquid phase is more understandable.

In certain of the preferred embodiments the condensed phase comprises a solid phase, or a mixture of a solid phase and a liquid phase. The condensed phase may also comprise a plurality of particles. The particles may comprise a solid carbonaceous phase, a liquid phase, or a mixture of a solid phase and a liquid phase. If the particles predominantly comprise a solid phase, the particles may have an substantially fixed and fixed and stable size, and a regular or an irregular shape. In some embodiments, the condensed phase additionally comprises soot. Soot, which may be a major component of the solid phase, is sometimes described in the art as "mature soot". Soot is typically an amorphous aggregate of solid carbonaceous materials, which are typically substantially insoluble in organic solvents, and contain only insignificant quantities of PAH compounds or hydrogen atoms. These soot particles may comprise fractal aggregations of smaller monodispersed, approximately spherical carbonaceous particles. "Mature soot" is to be contrasted with the "immature" particles of the invention, described below.

In certain preferred embodiments, at least some of the particles comprise relatively large amounts of the liquid phase, relatively small amounts of a solid carbonaceous phase, and need not have a substantially fixed or stable size and shape. These "liquid-like" particles are termed "immature" soot particles, in that the liquid phase, which comprises PAH compounds, has not undergone thermolysis and/or dehydrogenation, to form mature carbonaceous soot, fullerenes, or nanotubes. In more highly preferred embodiments, particles predominantly comprising a liquid phase are predominantly liquid droplets, which may be at least partially transparent to visible light.

The particles of condensed phase are typically microscopic, but may vary widely in size. The prior art discloses that particles formed in flames are typically from about one nanometer to about fifty nanometers (i.e, about $1-50 \times 10^{-9}$ meter) in size. Surprisingly, the particles collected from flames by the methods of the instant invention are typically much larger than one nanometer. In preferred embodiments of the invention, at least a portion of the collected particles have a smallest linear dimension of at least about, or greater than, $5 \times 10^{-8}$ meters. In more preferred embodiments, at least some of the particles are still larger, having smallest linear dimensions of at least about $10^{-7}$ meters, or $10^{-6}$ meters (one micrometer). In certain highly preferred embodiments, the particles collected from the flame have an average size of about $0.7 \times 10^{-6}$ meters, with most particles having a size between about 0.5 and about $1.2 \times 10^{-6}$ meters.

The carbon-containing material can be condensed in a flame, or by heating, to form the condensed phase containing PAH compounds. In preferred embodiments, the carbon-containing material comprises a hydrocarbon. In more preferred embodiments, the carbon-containing material comprises a $C_1-C_{18}$ hydrocarbon, or a $C_2-C_{15}$ hydrocarbon. In highly preferred embodiments, the carbon-containing material comprises a $C_2-C_{12}$ hydrocarbon. The hydrocarbons may contain heteroatoms such as oxygen, nitrogen, or sulfur, although hydrocarbons containing only carbon and hydrogen are preferred. The hydrocarbons may be a substituted or unsubstituted, branched or unbranched compound comprising an alkane, an alkene, an alkyne, an aromatic compound, or a mixture thereof. Alkene, alkyne, and aromatic hydrocarbons are preferred.

In certain preferred embodiments, the carbon-containing material comprises a hydrocarbon compound such as methane, ethane, ethylene, propane, butane, pentane, cyclopentane, methylcyclopentane, hexane, cyclohexane, methyl-cyclohexane, dimethyl-cyclohexane, acetylene, propylene, butene, butadiene, cyclopentadiene, dicyclopentadiene, benzene, toluene, xylene, ethylbenzene, styrene, napthalene, biphenyl, anthracene, phenanthrene, indene, or a mixture therof.

While hydrocarbons are typically employed, the carbon-containing material may also comprise a wide variety of naturally occurring and man-made substances, including natural gas, petroleum, and petrochemical derivatives thereof; wood, coal, charcoal, graphite, other carbon-containing materials derived from plants or animals; or waste or waste products derived from waste reclamation activities. Preferably, the carbon-containing material is combustible in the presence of oxygen, and does not comprise non-combustible compounds such as carbon dioxide, carbonates, highly halogenated carbon compounds, and the like.

In those embodiments of the invention wherein condensation of the carbon-containing material occurs in a flame, the flame preferably employs an oxidant, in order to combust flame fuels or partially combust the carbon-containing material. The preferred oxidant is air or $O_2$, but other suitable oxidants such as nitrous oxide may be employed.

In yet other preferred embodiments of the methods of the invention, the condensed phase comprising polycyclic aromatic hydrocarbons may be produced by controlled heating or pyrolysis of carbon-containing materials in the gas phase, but outside a flame. Carbon-containing materials may be vaporized and/or introduced into a heated chamber, in the presence of optional agents, to produce condensed phases comprising polycyclic aromatic hydrocarbons. Preferred carbon-containing materials for use in these embodiments comprise low molecular weight aliphatic and aromatic hydrocarbons, and low molecular weight polycyclic aromatic hydrocarbons. Preferred carbon-containing materials for these processes include ethylene, propylene, butene, acetylene, butadiene, benzene, toluene, xylenes, napthalene, and the like. Oxidants may be optionally employed in these embodiments.

The inventive method also involves collecting the condensed phase. Collecting the condensed phase from the flame can be defined as removing the condensed phase from the combustion zones of the flame without complete destruction of the condensed phase, to a remote location, regardless of whether the concentration of the condensed phase is thereby increased or decreased.

In certain embodiments of the invention, the collecting step comprises separating the condensed phase from the flame. The act of separating the condensed phase from the flame is defined as removing the condensed phase from the combustion zones of the flame without complete destruction of the condensed phase, and can involve subsequent concentration of the condensed phase.

The collecting step can further comprise isolating the condensed phase. A step of isolating the condensed phase is defined as removing the condensed phase from the combustion zones of the flame without complete destruction of the condensed phase, and concentrating it to yield macroscopic quantities the condensed phase, and removing any gaseous feedstocks for the flame, such as air, oxygen, and the uncombusted carbon-containing materials.

In one example, the collecting step comprises quenching the flame with a diluent gas, and separating the condensed phase from the diluent gas. Quenching the flame with diluent gas rapidly lowers the temperature, and terminates combustion in the flame, so that carbonization of the PAH compound in the condensed phase is inhibited. Suitable diluent gases include air, nitrogen, carbon dioxide, and non-combustible, non-reactive gases such as helium, neon, argon, and the like.

In another example, the collecting step comprises removing the condensed phase from the flame by suction. Suction of the flame is defined as utilizing a probe or collection device having an inlet in fluid connection with a source of vacuum, so that the condensed phase and other contents of the combustion zone of the flame are drawn into the vacuum, so that they rapidly expand and cool, and so that combustion is terminated. The condensed phases sucked into the vacuum probe or collection device may or may not be mixed with additional diluent gases.

In addition, the collecting step can comprise physically impacting flame components upon a solid collecting surface, to cause condensed phase particles to adhere, absorb, or adsorb onto the surface.

PAH compounds can have a variety of uses. They may be used as fuels or solvents. They may be used as chemical intermediates for the synthesis of other useful carbonaceous materials, such as carbon black, graphite, charcoal, tar, or diamond. The condensed phases comprising PAH compounds may be further reacted outside a flame, to produce highly valuable carbonaceous materials, such as a fullerenes and nanotubes.

To this end, the invention can further include a step comprising reacting the collected condensed phase to form at least one carbonaceous material.

The carbonaceous materials preferably comprise carbon, though they may contain minor quantities of hydrogen, and small quantities of heteroatoms. In this regard, carbonaceous materials preferably comprise greater than about 95% by weight of carbon, with only small quantities of hydrogen (less than about 5% by weight), and no more than trace quantities of heteroatoms. Even more preferably, carbonaceous materials comprise substantially pure carbon, with no more than trace quantities of hydrogen.

In many preferred embodiments, the step of reacting produces a carbonaceous material which comprises a fullerene, a nanotube, or a mixture thereof. The formation of mixtures of fullerenes and/or nanotubes is typical.

For the purposes of this invention, fullerenes are defined as polycyclic compounds having a non-planar carbon skeleton comprising twenty or more carbon atoms, bonded to form fused five and/or six membered rings, wherein at least one of the rings is aromatic. Fullerenes may have either even or odd numbers of carbon atoms, and may contain hydrogen atoms.

The fullerene is preferably a polycyclic compound having a non-planar carbon skeleton comprising fused five and/or six membered aromatic rings, having the formula $C_{20+2m}$, where m is 0 or a positive integer. Fullerenes within this definition may have an open carbon shell or cage, but preferably have a closed carbon shell or cage.

The fullerene is more preferably a $C_{60}$ compound having a carbon skeleton in the form of a closed truncated polyhedron of sixty vertices, or a $C_{70}$ compound having a closed carbon skeleton of seventy vertices. The $C_{60}$ compound is well-known, having trivial names which include "Buckyball" and "Buckminsterfullerene". The $C_{70}$ compound is also well-known, having a shape which approximates that of a football.

The nanotubes produced by the methods of the invention are substantially hollow tubules having walls composed of closed cylindrical sheets of hexagonally arrayed carbon atoms. Nanotubes are a subset of the more general class of fullerenes. The carbon atoms of the walls of the nanotubes may be bonded to small amount of hydrogen or other heteroatoms. Typically the cylindrical sheets have diameters ranging from a fraction of a nanometer, up to about 500 nanometers. Preferably, the cylindrical sheets have diameters from about 0.3 nanometers up to about 50 nanometers. The lengths of the tubules may vary over a wide range, ranging upward about 1 nanometer. Longer tubule lengths are generally preferred, and continuous "thread-like" tubules of macroscopic lengths (or larger) are most preferred. Preferably, the minimum lengths of the tubules range from about 10 nanometers, from about 1 micrometer, or from about 1 millimeter. As is known in the art, nanotubes may or may not have approximately hemispherical carbon "caps" comprising residues resembling other fullerenes attached at one or both ends of the tubules.

Preferably, the hexagonally arrayed carbon atoms of the tubule walls form fused six-membered rings which are aromatic, contain little or no hydrogen or other heteroatoms, and therefore the cylindrical sheets are graphitic in character.

In some preferred embodiments, the nanotube comprises a hollow graphite tubule. In some preferred embodiments, the hollow tubule has from about 1 to about 50 concentric cylindrical sheets of hexagonally-arranged carbon atoms. In an alternative preferred embodiment, the hollow graphite tubule has a wall with only a single sheet of hexagonally-arranged carbon atoms.

The fullerene is more preferably a $C_{60}$ compound having a carbon skeleton in the form of a closed truncated polyhedron of sixty vertices, or a $C_{70}$ compound having a closed carbon skeleton of seventy vertices. The $C_{60}$ compound is well-known, having trivial names which include "Buckyball" and "Buckminsterfullerene". The $C_{70}$ compound is also well-known, having a shape which approximates that of a football.

The nanotubes produced by the methods of the invention are substantially hollow tubules having walls composed of closed cylindrical sheets of hexagonally arrayed carbon atoms. Nanotubes are a subset of the more general class of fullerenes. The carbon atoms of the walls of the nanotubes may be bonded to small amount of hydrogen or other heteroatoms. Typically the cylindrical sheets have diameters ranging from a fraction of a nanometer, up to about 500 nanometers. Preferably, the cylindrical sheets have diameters from about 0.3 nanometers up to about 50 nanometers. The lengths of the tubules may by vary over a wide range, ranging upward about 1 nanometer. Longer tubule lengths are generally preferred, and continuous "thread-like" tubules of macroscopic lengths (or larger) are most preferred. Preferably, the minimum lengths of the tubules range from about 10 nanometers, from about 1 micrometer, or from about 1 millimeter. As is known in the art, nanotubes may or may not have approximately hemispherical carbon "caps" comprising residues resembling other fullerenes attached at one or both ends of the tubules.

Preferably, the hexagonally arrayed carbon atoms of the tubule walls form fused six-membered rings which are aromatic, contain little or no hydrogen or other heteroatoms, and therefore the cylindrical sheets are graphitic in character. In some preferred embodiments, the nanotube comprises a hollow graphite tubule. In some preferred embodiments, the hollow tubule has from about 1 to about 50 concentric cylindrical sheets of hexagonally-arranged carbon atoms. In an alternative preferred embodiment, the hollow graphite tubule has a wall with only a single sheet of hexagonally-arranged carbon atoms.

In certain embodiments, at least some of the ring residues of the fullerene or nanotube are partially hydrogenated, and the fullerene or nanotube therefore contains hydrogen. In alternative preferred embodiments the partially hydrogenated fullerene or nanotube is a polycyclic compound having a non-planar carbon skeleton comprising fused five and/or six membered aromatic rings, having the formula $C_{20+2m}H_n$, where m is 0 or a positive integer, and n is less than m.

The step of reacting the collected condensed phase to form a carbonaceous material occurs outside the flame used to produce the condensed phase, though the step of reacting may occur in a separate flame. The step of reacting may occur in a solid phase, a liquid phase, or a vapor phase. Preferably the step of reacting occurs in a suitable reactor. The step of reacting may occur over periods of time as short as milliseconds. In certain preferred embodiments, the step of reacting occurs over longer time periods, such as one second, one minute, one or more hours, or even one or more days. Longer reaction times are often beneficial in that they may produce higher yields, greater purity, and lower levels of structural defects in solid materials such as fullerenes and nanotubes.

Preferably, the reacting occurs in a liquid phase. Moreover, the step of reacting preferably comprises heating or thermolysis, at a temperature sufficient to induce the condensed phase to form carbonaceous materials. In a more preferred embodiment, the heating or thermolysis occurs at a temperature from about 150° C. to about 2500° C. In an even more preferred embodiment, the heating or thermolysis occurs at a temperature from about 200° C. to about 2000° C. In a highly preferred embodiment, the heating or thermolysis occurs at a temperature from about 250° C. to about 1500° C. The heating may occur by a variety of methods, including a flame, resistive heating, radiative heating, convective heating, electric arc, laser photolysis, or other similar methods.

In certain preferred embodiments, the reacting comprises photolysis, dehydrogenating, polymerizing, reducing, or oxidizing. In many of these embodiments, it is desirable to induce the condensation, dimerization, or polymerization of PAH compounds by inducing the presence of odd-electron, radical species. Photolysis, reducing, or oxidizing PAH compounds are means for inducing the presence of radical species. Photolysis may be induced by absorption of light of any wavelength sufficient to induce condensation, dimerization, or polymerization of PAH compounds, but the wavelength of the light preferably is in the ultra-violet range of wavelengths. Oxidation is carried out using various oxidizing agents, which include oxygen compounds, $O_2$, hydrogen peroxide, organic hydroperoxides, metal compounds having metal atoms in high valence states, and the like. Reduction is carried out using reducing agents, which may include active hydrogen compounds, $H_2$, metals in low oxidation state, including alkali metals, alkaline earth metals, zinc, and copper, or suitable compounds or complexes thereof.

In some embodiments, the reacting of the condensed phase to produce carbonaceous materials also produces $H_2$ gas as a product. This may be desirable in that the condensed phase, and the PAH compounds therein are useful as hydrogen storage media.

The reacting of the condensed phase and/or PAH's to form a carbonaceous material can occur in the presence of at least one agent. The agent is defined as any chemical compound added to the condensed phase in order to form or aid the formation of the carbonaceous material from the condensed phase.

The agent preferably comprises a hydrocarbon, a polycyclic aromatic hydrocarbon, an oxidizing agent, a reducing agent, a free-radical inducing agent, a catalyst, or a mixture thereof. The hydrocarbon may be employed for a variety of purposes, including but not limited to use as a co-reactant or a solvent. The oxidizing agent and reducing agents have been described above. The polycyclic aromatic hydrocarbon is typically derived from a source other the collected condensed phase, and typically serves as a co-reactant to improve the formation of fullerenes and nanotubes. Preferred polycyclic aromatic hydrocarbon agents include napthlene, biphenyl, anthracene, phenanthrolene, and the like.

In certain preferred embodiments, the agent is a catalyst, which improves the rate or selectivity of the formation of carbonaceous materials such as fullerenes and/or nanotubes. Preferred catalysts include a metal or a metal compound. Preferred metals include transition metals, lanthanide metals, and transition metals. Preferred transition metals or metal compounds comprise Ti, Zr, Hf, V, Nb, Ta, Cr, Mo, W, Mn, Re, Fe, Ru, Os, Co, Rh, Ir, Ni, Pd, or Pt, Zn, Cu, or Hg. The most preferred transition metals or metal compounds comprise Fe, Ru, Os, Co, Rh, Ir, Ni, Pd, or Pt. Preferred metal compound catalysts are metallocene or metal carbonyl compounds of the above described metals. Metallocene catalyst compounds have a metal atom coordinated to at least one aromatic hydrocarbon ligand. Preferred metallocene catalyst compounds have aromatic aromatic hydrocarbon ligands comprising a cyclopentadieynl or benzene residue. Ferrocene, $Fe(C_5H_5)_2$; and chromocene, $Cr(C_6H_6)_2$; are non-exhaustive examples of preferred metallocene catalyst compounds. Metal carbonyl catalyst compounds have a metal atom coordinated to at least carbon monoxide ligand. Iron pentacarbonyl, $Fe(CO)_5$, iron dodecacarbonyl, $Fe_3(CO)_{12}$; and cobalt octacarbonyl, $Co_2(CO)_8$; are non-exhaustive examples of preferred metal carbonyl catalyst compounds.

The fullerene and nanotube products produced by the processes may be purified by standard methods known to those of skill in the art. Such methods of purification include extraction, chromatography, sublimation, and the like.

The products produced by the various embodiments of the processes of the invention are typically different than, and/or superior to the products of prior art processes, in that conditions for forming specified polycyclic aromatic hydrocarbons, fullerenes, and nanotubes can be easily and broadly manipulated relative to prior art vapor phase and flame based processes, which can improve the yields, selectivities, and number of defects in the fullerene products. The number of defects may be improved by operation under controllable conditions which more closely approximate those of chemical equilibrium, and favor more stable fullerene structures. Because the yields can be improved, the resulting costs of production and purification can be improved. The character of certain products (especially nanotubes) may also be improved, in that the wall diameter and/or length of the product nanotubes may be controlled.

EXPERIMENTAL

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature, and pressure is at or near atmospheric.

Example 1

Collection and Analysis —A burner was constructed of four 1.1 mm ID, 1.5 mm OD, 65 mm long brass tubes, soldered into a brass plug and clustered together in a square pattern, with the inlets of the brass tubes fluidly connected to a supply of pure acetylene gas. The acetylene gas was regulated to flow at approximately 2.4 cm$^3$/sec, and was ignited in air at atmospheric pressure to form a smoking diffusion flame that was approximately 11 cm in height, and 8 mm in diameter.

A device for collecting materials from the flame was constructed from a 3.2 mm OD, 1.4 mm ID, 6.0 cm long stainless steel sampling tube, one end of which was connected to a first inlet of a 250 milliliter aerosol dilution chamber. An outlet of the dilution chamber was connected, via 3.2 mm ID tubing, to a Real Time Aerosol Mass Spectroscopy ("RTAMS") apparatus for mass spectroscopic analysis of collected materials, which provides a source of vacuum by drawing an inlet volume of 42 cm$^3$/sec. A second inlet to the dilution chamber provided room air to dilute collected materials.

The sampling tube was carefully positioned immediately adjacent to, and perpendicular to the acetylene flame, at a specified height relative to the flame burner nozzle (typically 3 cm). The flame contents were then sampled in short pulses by briefly blocking and then unblocking the second inlet of the dilution chamber. Because of the relatively large diameter of the sampling tube compared to the width of the flame, and the high flow of gas to the RTAMS relative to the acetylene flow, the entire luminescent body of the flame at and above the sampling height was sucked into the sampling tube each and every the flame was sampled, yielding a consistent collection of particles from the entire lateral cross section of the flame at approximately the same vertical distance from the nozzle. The flame was immediately quenched in the sample tube, and diluted with room air in the sample chamber, which did not rise significantly above room temperature during the experiment. The residence time of the collected materials in the dilution chamber is less than 10 seconds.

Figure 2:
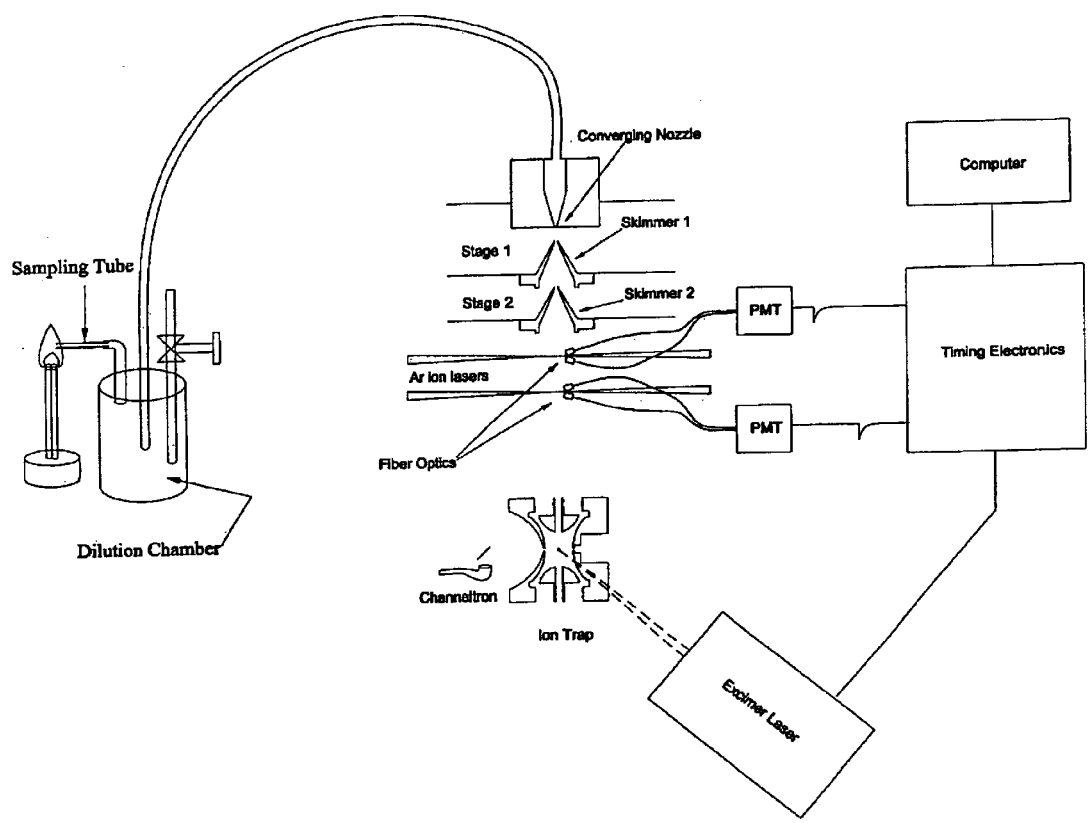
FIG. 2 shows a drawing of the main features of the apparatus used in Example 1 for collecting and analyzing materials from a flame.

Aerosol particles, collected in the dilution chamber, were sucked into the RTAMS device. To summarize, particles enter the RTAMS through a differentially pumped inlet consisting of a nozzle and two skimmers. Upon entering the main chamber on their way to the center of an ion trap, they pass through two focussed Ar$^+$laser beams, and scatter light. The scattered light is collected with fiber optics and detected at two separate photomultiplier tubes (PMTs). The PMT signals are converted into TTL levels and sent to timing electronics that permit recording of the particle flight time as well as triggering an ablation/ionization laser to fire when the particle reaches the center of the ion trap regardless of the particle velocity or size. The particles are heated, ablated, and ionized by a 20 ns, 7 mJ pulse from a 308 nm excimer laser focussed into the center of the ion trap with a 250 mm FL lens to a 500×350 $\mu$m spot resulting in a fluence of 4 J/cm2, or an irradiance of 2×10$^8$ W/cm2. The ablated ions are held in the trap where they are subjected to standard ion trap techniques for analysis. The particle flight time between the two Ar$^+$ beams directly correlates to the aerodynamic particle size. The experimental apparatus has been described in detail in the following references (Gieray et.al., Anal. Chem., Vol 70, pg 117–120, 1998; Reilly el.al., Environ. Sci. Technol., Vol 32, pg 2672–2679, 1998; Gieray et.al., Microbiological Methods, Vol 29, 191–199, 1997; Reilly et.al., Anal. Chem., Vol 69, pg 36–39, 1997; Prather et.al., Anal. Chem., Vol. 66, 1403–1407, 1994), which are hereby incorporated in their entirety by this reference. A drawing showing the main features of the sampling and RTAMS apparatus is shown in FIG. 2.

Size and Composition Analysis of Condensed Phases Collected From A Flame—Two thousand particles from the flame were removed from the dilution chamber and subjected to analysis for size and composition by mass spectroscopy in the RTAMS apparatus.

Figure 3:
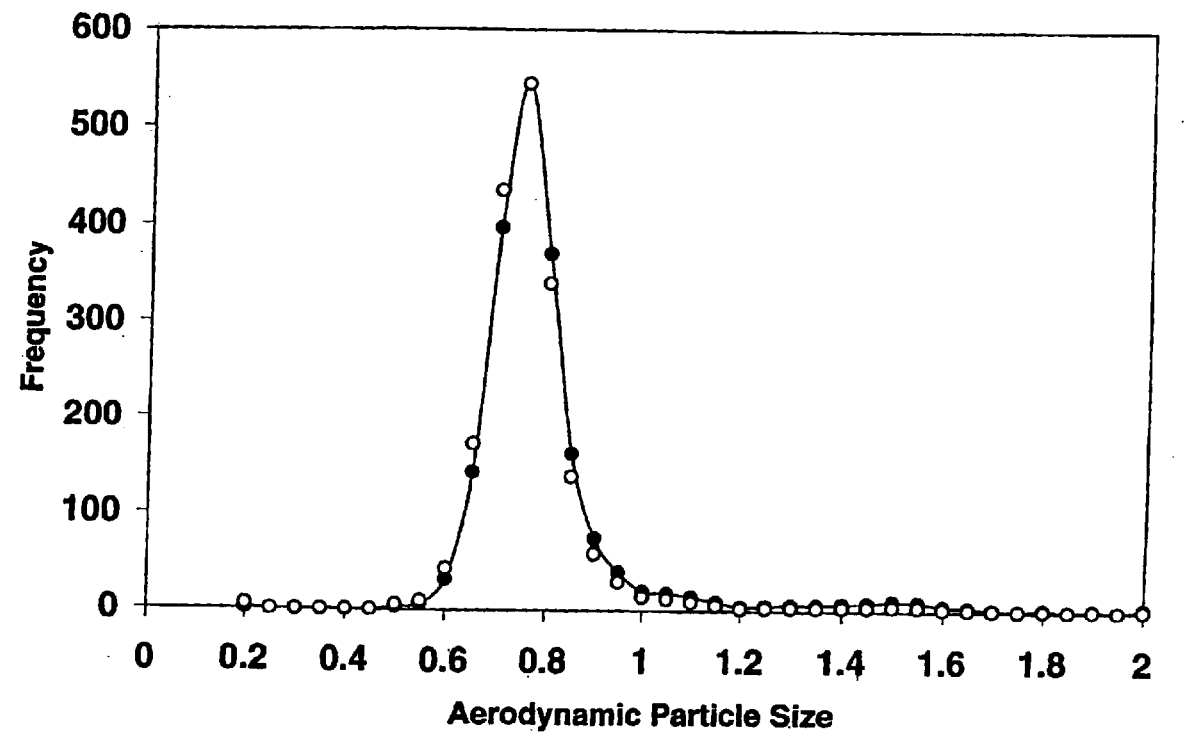

The aerodynamic particle size of each of the 2000 particles were measured in the RTAMS apparatus, which has a lower size detection limit of 200 nm. Aerodynamic particle size yields a correlation between particle composition and size (see Reilly et.al., Environ. Sci. Technol., Vol 32, pg 2672–2679, 1998; and Prather et.al., Anal. Chem., Vol. 66, 1403–1407, 1994.) FIG. 3 shows the aerodymnamic particle size distribution of the 2000 particles. The distribution peaks at a particle size of about 750 nm (0.75 microns.)

Figure 4:
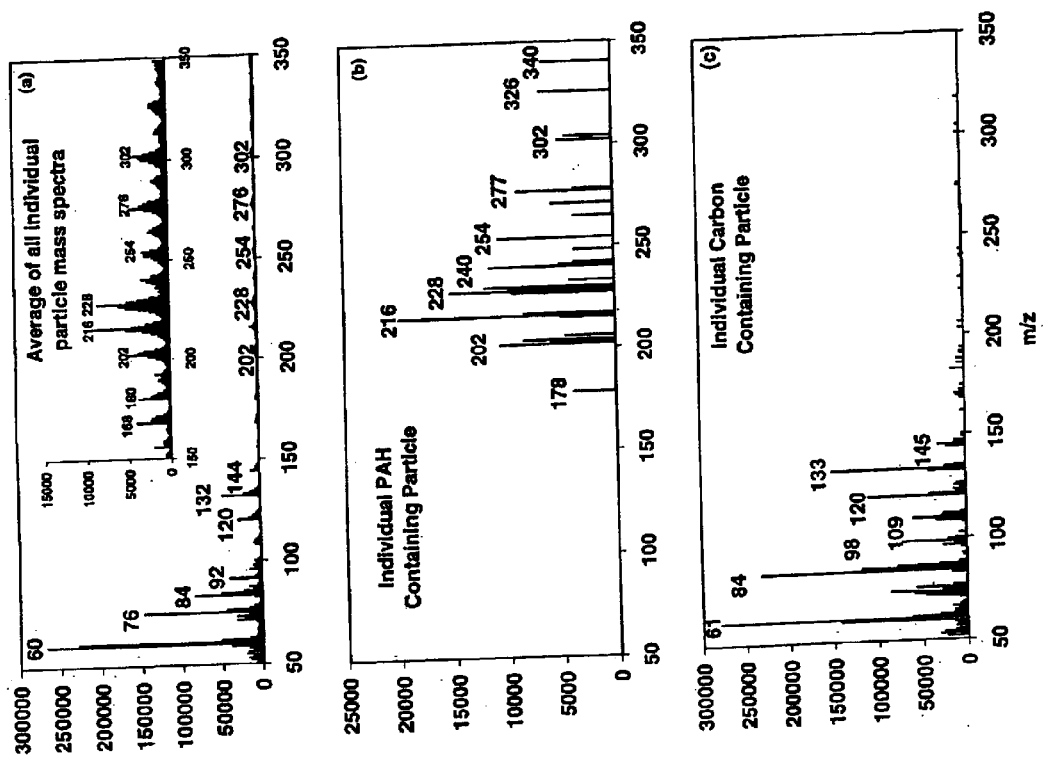
FIG. 4 shows three mass spectra (a–c) of particles collected from an acetylene flame, as described in Example 1.

Of the 2000 particles subjected to analysis by mass spectroscopy, only 1442 yielded a coherent signal, therefore the non-coherent "spectra" of the remaining particles were discarded as "misses" by the analytical apparatus. Very significant differences were observed between the mass spectra of particles having various signal intensities, as measured by and correlated to relative total ion count (RIC). FIG. 4a shows an averaged spectrum of 1440 of the particles. FIG. 4b shows a representative individual spectrum of a particle having a low RIC (less than 20,000), and FIG. 4c shows a representative individual spectrum of a particle having a high RIC (greater than 250,000).

Figure 5:
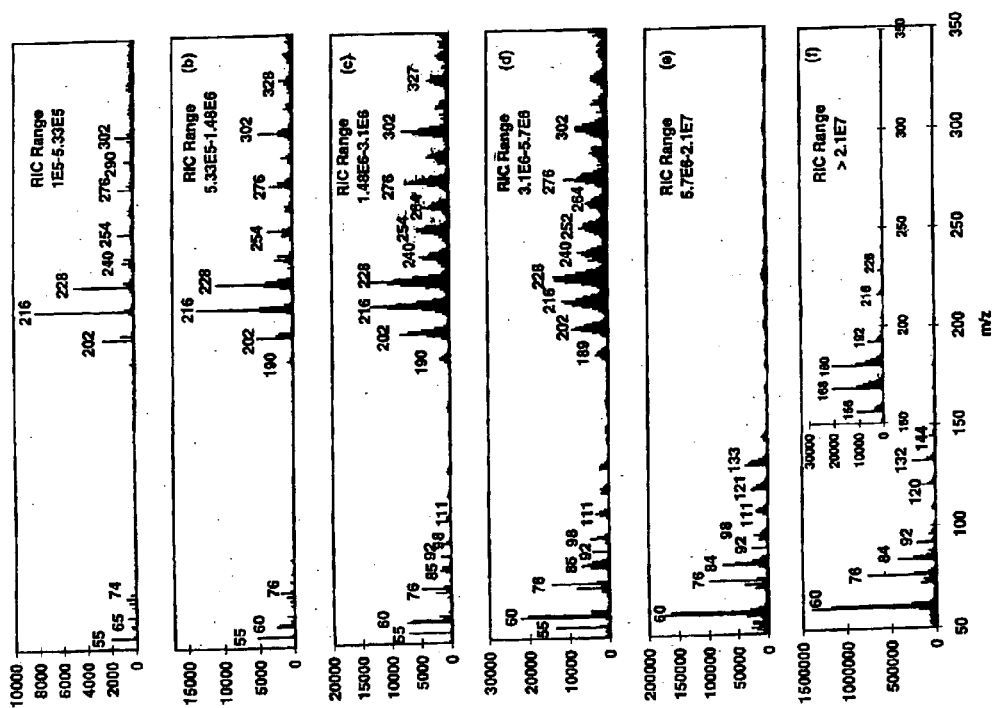
FIG. 5 shows six mass spectra (a–f) produced by averaging the mass spectra of groups of 240 particles collected from an acetylene flame, and sorted into groups on the basis of their RIC values, as described in Example 1.
Figure 6:
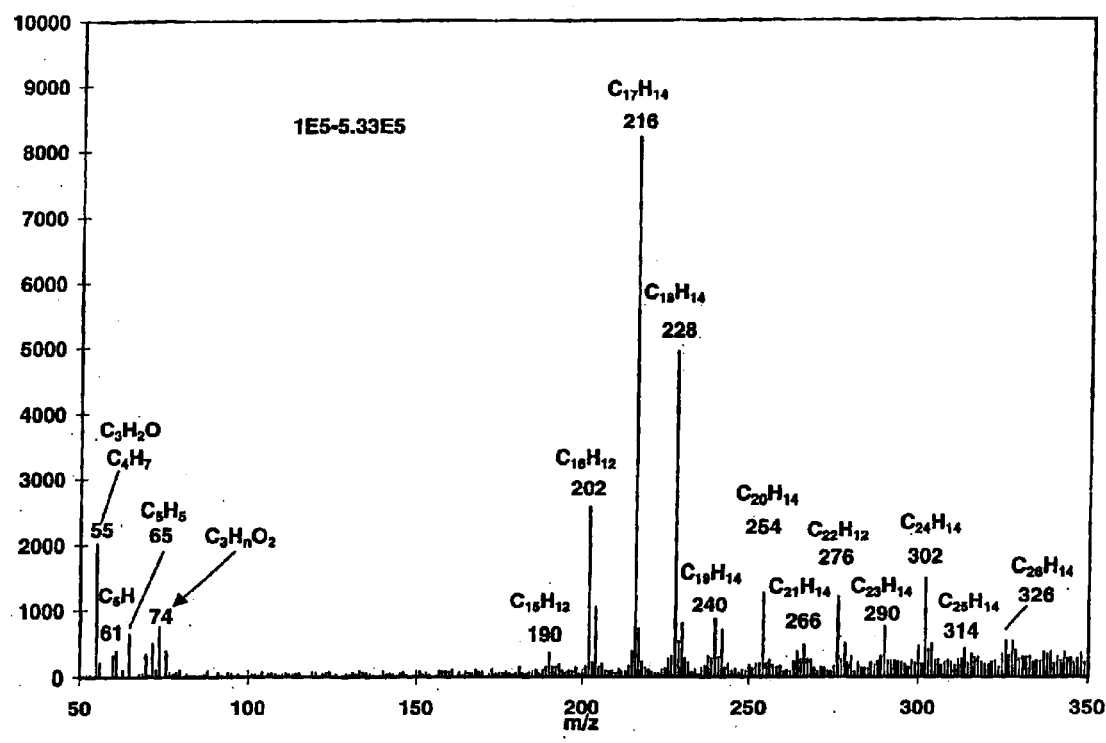
FIG. 6 shows an expanded view of the mass spectrum of FIG. 5a, labeled to show the chemical species corresponding to the major parent ion peaks.

The mass spectra were then sorted into six groups of 240 spectra, based on RIC, then the groups of 240 spectra were averaged. FIGS. 5a–f, show the average spectra of the six groups, presented in order of increasing RIC. As can be seen in FIG. 5a, (which is reproduced in expanded format in FIG. 6), particles having low RIC values predominantly have ions at M/Z from about 190 to about 302, with a maximum at about 216, corresponding to the chemical formulas shown in FIG. 6. The chemical formulas shown in FIG. 6 correspond to a subset of preferred low molecular weight polycyclic aromatic hydrocarbons of the invention. These particles are particles that are believed to be rich in PAH compounds.

As RIC increases in FIGS. 5c,d, relatively high molecular weight PAH compounds increase in intensity. As RIC increases still further (see FIGS. 5e,f) mass spectral peaks corresponding to PAH compounds become virtually insignificant, indicating particles having few or no PAH compounds. FIGS. 5e,f represent particles which are believed to be primarily comprised of soot.

Figure 7:
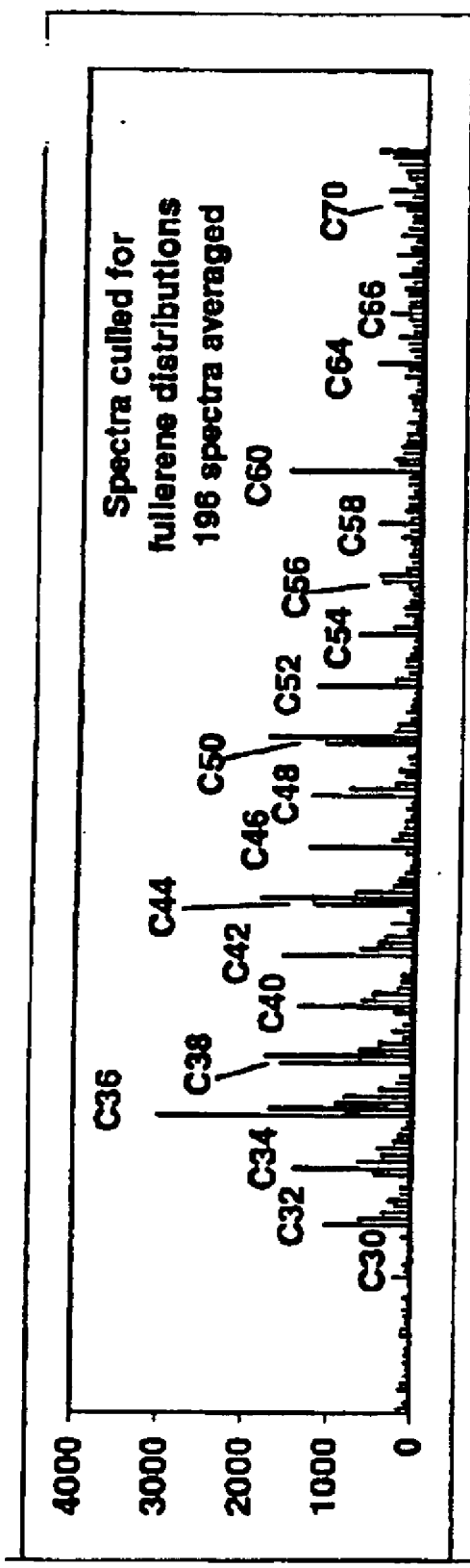
FIG. 7 shows the average mass spectrum (at high mass values) of 196 particles collected from an acetylene flame, as described in Example 1.

The mass spectra of the 1440 particles were also culled for particles showing significant RIC at higher masses (M/Z between about 300 and 900), corresponding to masses expected for fullerenes. Significant RIC for fullerenes were shown by 196 particles, whose spectra were averaged to produce FIG. 7. As can be seen significant peaks were observed at M/Z 720, corresponding to $C_{60}$, Buckminsterfullerene, and M/Z 840, corresponding to $C_{70}$.

Example 2

Figure 8:
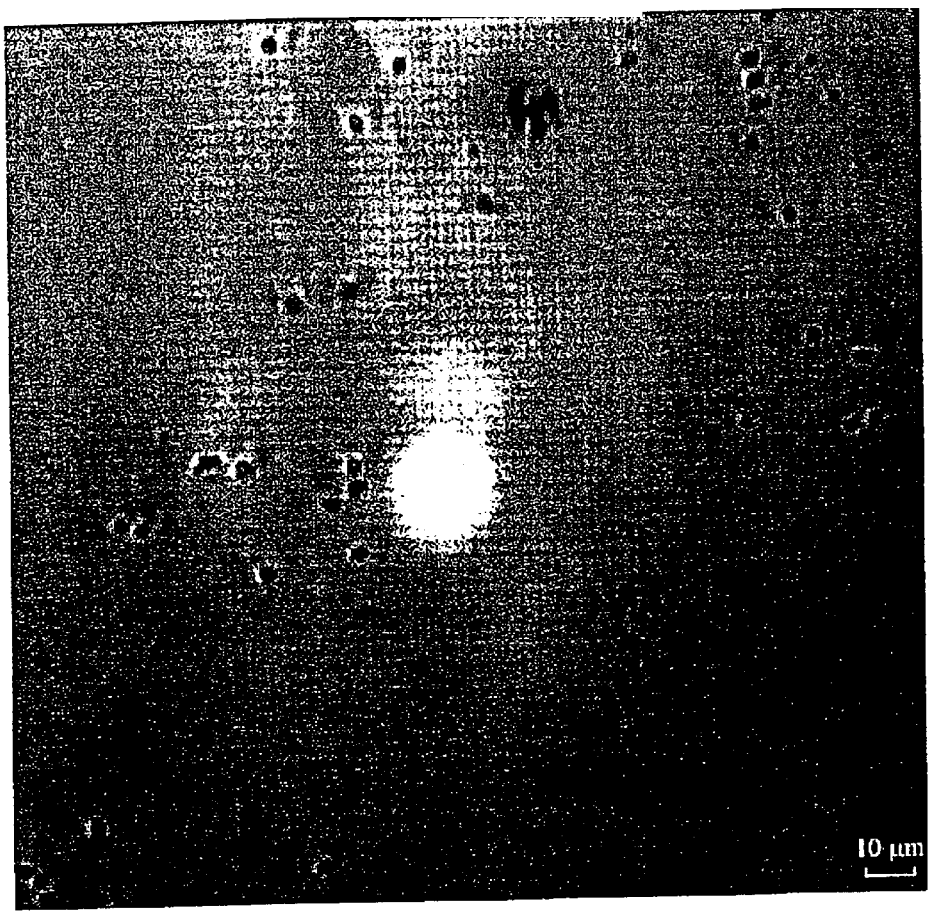
FIG. 8 shows an optical micrograph image of transparent micron sized PAH containing particles collected by impaction on a glass microscope slide, as described in Example 2.

A microscope slide was passed transversely through the acetylene flame produced by the burner apparatus described in Example 1, at a height of approximately 4 cm. An optical micrograph of the microscope slide was obtained, and is shown in FIG. 8. As can be seen in FIG. 8, optically transparent globular particles on the order of about 1 micron in size were observed. These particles were observed across the entire path of the flame over the microscope slide, but were not observed anywhere else on the slide. Mass spectroscopic analysis shows that the particles contain significant amounts of polycyclic aromatic hydrocarbons.

Throughout this application, various publications are referenced. The disclosures of these publications are hereby incorporated by reference, in their entireties, for all purposes.

It will be apparent to those skilled in the art that various substitutions, modifications, omissions, changes, and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing a polycyclic aromatic hydrocarbon comprising:

a. combusting a carbon-containing material in a flame to condense the carbon-containing material in the flame; and b. collecting from the flame at least a portion of a condensed phase comprising a liquid phase in the flame;

wherein the liquid phase has not undergone thermolysis and/or dehydrogenation to form mature soot, fullerenes or nanotubes, wherein the condensed phase comprises at least one polycyclic aromatic hydrocarbon.

2. The method of claim 1, wherein the polycyclic aromatic hydrocarbon is a compound having more than 6 carbon atoms bonded to form at least two rings, and at least one carbon-hydrogen bond; and wherein at least one of the rings is an aromatic ring.

3. The method of claim 1, wherein the polycyclic aromatic hydrocarbon comprises a plurality of fused five and six membered rings.

4. The method of claim 1, wherein the polycyclic aromatic hydrocarbon comprises one or more of the polycyclic hydrocarbons identified by the National Institute of Standards and Technology Special Publication 922. or a partially hydrogenated derivative thereof.

5. The method of claim 1, wherein the polycyclic aromatic hydrocarbon has sufficient hydrogen atoms to have at least one ring with at least one saturated —$CH_2$— group.

6. The method of claim 1, wherein the polycyclic aromatic hydrocarbon comprises at least one low molecular weight polycyclic aromatic hydrocarbon, at least on high molecular weight polycyclic aromatic hydrocarbon, or a mixture thereof.

7. The method of claim 6, wherein the low molecular weight polycyclic aromatic hydrocarbon has from about ten to thirty carbon atoms.

8. The method of claim 6, wherein the low molecular weight polycyclic aromatic hydrocarbon has a molecular weight from about 140 to about 400 grams per mole.

9. The method of claim 6, wherein the low molecular weight polycyclic hydrocarbon has from about thirty carbon atoms to about 1000 carbon atoms.

10. The method of claim 6, wherein the high molecular weight polycyclic aromatic hydrocarbon is an oil.

11. The method of claim 1, wherein the condensed phase is a liquid phase.

12. The method of claim 11, wherein the condensed phase further comprises a solid phase.

13. The method of claim 1, wherein the condensed phase comprises a plurality of particles.

14. The method of claim 13, wherein at least a portion of the particles have a smallest line at dimension of at least $5 \times 10^{-8}$ meters.

15. The method of claim 1, wherein the condensed phase additionally comprises soot.

16. The method of claim 1, wherein the collecting step comprises separating the condensed phase from the flame.

17. The method of claim 1, wherein the collecting step further comprises isolating the condensed phase.

18. The method of claim 1, wherein the collecting step comprises quenching the flame with a diluent gas, and separating the condensed phase from the diluent gas.

19. The method of claim 1, wherein the collecting step comprises removing the condensed phase from the flame by suction.

20. The method of claim 1, further comprising the step of extracting the collected condensed phase with an extraction medium.

21. The method of claim 20, wherein the extraction medium comprises an organic solvent.

22. The method of claim 1, wherein the carbon-containing material comprises
   a. natural gas, petroleum, wood, coal, charcoal, graphite, or other carbon containing materials derived from plants or animals; or
   b. waste, or waste products.

23. The method of claim 1, wherein the carbon-containing materials comprises a hydrocarbon.

24. The method of claim 1, wherein the carbon-containing material comprises an alkane, an alkene, an alkyne, an aromatic compound, or a mixture thereof.

25. The method of claim 1, wherein the carbon-containing material comprises methane, ethane, ethylene, propane, butane, cyclopentane, methylcyclopentane, hexane, cyclohexane, methyl-cyclohexane, dimethyl-cyclohexane, acetylene, propylene, butene, butadiene, cyclopentadiene, dicyclopentadiene, benzene, toluene, xylene, ethylbenzene, styrene, naphthalene, biphenyl, anthracene, phenanthrene, indene, or a mixture thereof.

26. The method of claim 1, wherein the flame employs an oxidant.

27. The method of claim 26, herein the oxidant is air or $O_2$.

28. The method of claim 1, further comprising:
   (c) reacting the collected condensed phase to form at least one carbonaceous material.

29. The method of claim 28, wherein the reacting occurs in a liquid phase.

30. The method of claim 28, wherein the reacting comprises heating.

31. The method of claim 30, wherein the heating occurs at a temperature from about 150° C. to about 2500° C.

32. The method of claim 28, wherein the reacting comprises photolysis, dehydrogenating, polymerizing, reducing, or oxidizing.

33. The method of claim 28, wherein the reacting produces $H_2$.

34. The method of claim 28, wherein the reacting occurs in the presence of at least one agent.

35. The method of claim 34, wherein the agent is a $C_1$–$C_{25}$ hydrocarbon, a polycyclic aromatic hydrocarbon, anoxidizing agent, a reducing agent, a free-radical inducing agent, a catalyst, or a mixture thereof.

36. The method of claim 34, wherein the agent is a catalyst.

37. The method of claim 36, wherein the catalyst is a metal or metal compound.

38. A method for producing a polycyclic aromatic hydrocarbon, the method comprising:
   a. combusting at least one carbon-containing material in a flame to condense the carbon-containing material in the flame; and
   b. collecting from the flame at least a portion of a condensed phase comprising a liquid phase in the flame;
   wherein the liquid phase has not undergone thermolysis and/or dehydrogenation to form mature soot, fullerenes or nanotubes,
   wherein the condensed phase comprises pyrene.

39. The method of claim 38, wherein the collecting step comprises removing the condensed phase from the flame by suction.

40. The method of claim 38 wherein the carbon-containing material is a hydrocarbon.

41. A method for producing a polycyclic aromatic hydrocarbon, the method comprising:
   a. combusting a carbon-containing material in a flame to condense the carbon-containing material in the flame; and
   b. collecting from the flame at least a portion of a condensed phase comprising a liquid phase in the flame;
   wherein the liquid phase has not undergone thermolysis and/or dehydrogenation to form mature soot, fullerenes or nanotubes,
   wherein the condensed phase comprises at least one polycyclic aromatic hydrocarbon having from ten to thirty carbon atoms.

42. The method of claim 41 wherein the collecting step comprises removing the condensed phase from the flame by suction.

43. The method of claim 41 wherein the carbon-containing material is a hydrocarbon.

44. The method of claim 41 further comprising:
   c. reacting the collected condensed phase to form at least one carbonaceous material.

* * * * *

UNITED STATES PATENT AND TRADEMARK OFFICE
CERTIFICATE OF CORRECTION

| | |
|---|---|
| PATENT NO. | : 6,806,397 B1 |
| DATED | : October 19, 2004 |
| INVENTOR(S) | : Reilly |

It is certified that error appears in the above-identified patent and that said Letters Patent is hereby corrected as shown below:

Column 11,
Lines 8-34, should be deleted.

Signed and Sealed this

Thirty-first Day of May, 2005

JON W. DUDAS
*Director of the United States Patent and Trademark Office*